(12) United States Patent
Gapastione et al.

(10) Patent No.: US 10,492,065 B2
(45) Date of Patent: Nov. 26, 2019

(54) ENCRYPTION SYSTEM AND METHOD

(71) Applicant: Bank of America Corporation, Charlotte, NC (US)

(72) Inventors: Daniel Gapastione, Lewisville, NC (US); Manish Nigam, Plano, TX (US); Michael Stark, Sherborn, MA (US)

(73) Assignee: Bank of America Corporation, Charlotte, NC (US)

( * ) Notice: Subject to any disclaimer, the term of this patent is extended or adjusted under 35 U.S.C. 154(b) by 379 days.

(21) Appl. No.: 15/631,776

(22) Filed: Jun. 23, 2017

(65) Prior Publication Data

US 2018/0376329 A1   Dec. 27, 2018

(51) Int. Cl.
*H04L 29/06* (2006.01)
*H04W 12/04* (2009.01)
*H04W 12/06* (2009.01)
*H04L 9/08* (2006.01)

(52) U.S. Cl.
CPC ........... *H04W 12/04* (2013.01); *H04L 9/0816* (2013.01); *H04L 63/062* (2013.01); *H04L 63/068* (2013.01); *H04W 12/06* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 7,478,236 B2 | 1/2009 | Roh et al. | |
| 7,650,497 B2 | 1/2010 | Thornton et al. | |
| 7,653,810 B2 | 1/2010 | Thornton et al. | |
| 8,738,901 B2 | 5/2014 | Fu et al. | |
| 9,130,758 B2 | 9/2015 | Fu et al. | |
| 9,628,269 B2 * | 4/2017 | Little | G06F 21/606 |
| 9,807,086 B2 * | 10/2017 | Nordstrom | H04L 63/068 |

(Continued)

OTHER PUBLICATIONS

Seo, Seung-Hyun et al. Effective Key Management in Dynamic Wireless Sensor Networks. IEEE Transactions on Information Forensics and Security, vol. 10, Issue: 2. https://ieeexplore.ieee.org/stamp/stamp.jsp?tp=&arnumber=6975235 (Year: 2014).*

(Continued)

*Primary Examiner* — Jeremiah L Avery
(74) *Attorney, Agent, or Firm* — Michael A. Springs (57) ABSTRACT

A key management tool comprises a memory, an interface, a compatibility engine, a validation engine, a distribution engine, and a verification engine. The compatibility engine is configured to determine that the first device is compatible with the key management tool, the validation engine is configured to validate the first device, and the distribution engine is configured to communicate a first temporary key to the first device. The verification engine is configured to perform a first set of one or more checks on the first device after the first temporary key is communicated to the first device, the distribution engine is further configured to communicate a first permanent key to the first device if the first device passes the first set of one or more checks, and, subsequent to the communication of the first permanent key, the interface is configured to receive a request for a second permanent key.

20 Claims, 4 Drawing Sheets

(56) References Cited

U.S. PATENT DOCUMENTS

| | | | | |
|---|---|---|---|---|
| 2001/0026619 A1* | 10/2001 | Howard, Jr. | ............ | G06F 21/602 380/279 |
| 2007/0061873 A1* | 3/2007 | Shewchuk | ............ | H04L 9/3271 726/10 |
| 2010/0067705 A1* | 3/2010 | Boccon-Gibod | ....... | G06F 21/10 380/285 |
| 2010/0217837 A1* | 8/2010 | Ansari | ............ | G06F 16/64 709/218 |
| 2012/0204032 A1* | 8/2012 | Wilkins | ............ | H04L 9/006 713/170 |
| 2015/0143125 A1* | 5/2015 | Nix | ............ | H04W 4/70 713/171 |
| 2016/0179850 A1* | 6/2016 | Martin | ............ | G06F 16/214 707/634 |
| 2016/0364553 A1* | 12/2016 | Smith | ............ | G06F 21/105 |

OTHER PUBLICATIONS

Wu, Xiaoping et al. Secure Key Management of Mobile Agent System Using TPM-Based Technology on Trusted Computing Platform. 2008 International Conference on Computer Science and Software Engineering. https://ieeexplore.ieee.org/stamp/stamp.jsp?tp=&arnumber=4722515 (Year: 2008).*

Tan, Hengchuan et al. A Secure and Authenticated Key Management Protocol (SA-KMP) for Vehicular Networks. IEEE Transactions on Vehicular Technology, vol. 65, Issue: 12. https://ieeexplore.ieee.org/stamp/stamp.jsp?tp=&arnumber=7707427 (Year: 2016).*

Li, Chun-Ta et al. A Secure Three-party Authenticated Key Exchange Protocol Based on Extended Chaotic Maps in Cloud Storage Service. 2015 International Conference on Information Networking (ICOIN). https://ieeexplore.ieee.org/stamp/stamp.jsp?tp=& arnumber=7057852 (Year: 2015).*

Visaggio, Corrado Aaron; Blasio, Lorenzo Convertito. Session Management Vulnerabilities in Today's Web. IEEE Security & Privacy, vol. 8, Issue: 5. https://ieeexplore.ieee.org/stamp/stamp.jsp?tp=&arnumber=5487488 (Year: 2010).*

Patel, Vaishali; Gheewala, Jaydeep. An Efficient Session Key Management Scheme for Cluster Based Wireless Sensor Networks. 2015 IEEE International Advance Computing Conference (IACC). https://ieeexplore.ieee.org/stamp/stamp.jsp?tp=&arnumber=7154847 (Year: 2015).*

* cited by examiner

ENCRYPTION SYSTEM AND METHOD

TECHNICAL FIELD

This disclosure relates generally to encryption. More specifically, this disclosure relates to an encryption system and method.

BACKGROUND

Encryption systems facilitate the secure transfer of information using encryption keys. Generally, encryption keys are used to encrypt and decrypt information. Encryption of information may be desirable in many situations such as when sensitive information is being transmitted. Typical encryption systems manage the distribution of encryption keys.

SUMMARY OF THE DISCLOSURE

According to one embodiment, a key management tool includes a memory, an interface, a compatibility engine, a validation engine, a distribution engine, and a verification engine. The memory is configured to store a plurality of temporary keys, a plurality of permanent keys, and pre-defined credentials. The interface is configured to receive, from a first device that is unknown to the system, one or more unsecure communications, wherein the one or more unsecure communications comprise one or more of attributes of the first device, the attributes comprising one or more of specifications or capabilities of the first device or one or more credentials comprising identifying information of the first device, and wherein a device is unknown to the system when the device has not previously communicated with the system and a device is known to the system when the device has previously communicated with the system. The compatibility engine is configured to determine, based on the attributes of the first device, that the first device is compatible with the system, wherein the first device is compatible with the system if it can send and receive secure communications using the system. The validation engine is configured to validate the first device based on the received credentials of the first device, wherein validating the first device comprises comparing the received credentials of the first device to one or more of the pre-defined credentials. The distribution engine is configured to communicate a first temporary key of the plurality of stored temporary keys to the first device after determining that the first device is valid. The verification engine is configured to perform a first set of one or more checks on the first device after the first temporary key is communicated to the first device, the one or more checks being performed to determine whether the first device is a threat to the system. The distribution engine is further configured to communicate a first permanent key from the plurality of stored permanent keys to the first device if the first device passes the first set of one or more checks, the first permanent key having an expiration date and the interface is further configured to receive, from the first device, a request for a second permanent key from the plurality of stored keys at a time subsequent to the communication of the first permanent key.

According to another embodiment, a method includes receiving, from a first device that is unknown to the system, one or more unsecure communications, wherein the one or more unsecure communications comprise one or more of attributes of the first device, the attributes comprising one or more of specifications or capabilities of the first device or one or more credentials comprising identifying information of the first device, and wherein a device is unknown to the system when the device has not previously communicated with the system and a device is known to the system when the device has previously communicated with the system. The method further includes determining, based on the attributes of the first device, that the first device is compatible with the system, wherein the first device is compatible with the system if it can send and receive secure communications using the system, and validating the first device based on the received credentials of the first device, wherein validating the first device comprises comparing the received credentials of the first device to one or more pre-defined credentials. The method further includes communicating a first temporary key of the plurality of stored temporary keys to the first device after determining that the first device is valid, and after the first temporary key is communicated to the first device, performing a first set of one or more checks on the first device, the one or more checks being performed to determine whether the first device is a threat to the system. The method further includes communicating a first permanent key from the plurality of stored permanent keys to the first device if the first device passes the first set of one or more checks, wherein the first permanent key has an expiration date, and receiving, from the first device a request for a new permanent key from the plurality of stored keys at a time subsequent to the communication of the first permanent key.

According to another embodiment, a system includes a memory, an interface, and one or more processors. The memory is configured to store a plurality of temporary keys and a plurality of permanent keys and the interface is configured to receive, from a first device that is unknown to the system, one or more unsecure communications, wherein the one or more unsecure communications include one or more of attributes of the first device, the attributes comprising one or more of specifications or capabilities of the first device or one or more credentials including identifying information of the first device, and a device is unknown to the system when the device has not previously communicated with the system and a device is known to the system when the device has previously communicated with the system. The one or more processors configured to determine, based on the attributes of the first device, that the first device is compatible with the system, wherein the first device is compatible with the system if it can send and receive secure communications using the system, and validate the first device based on the received credentials of the first device, wherein validating the first device comprises comparing the received credentials of the first device to one or more pre-defined credentials. The one or more processor further configured to communicate a first temporary key of the plurality of stored temporary keys to the first device after determining that the first device is valid and, after the first temporary key is communicated to the first device, perform a first set of one or more checks on the first device, the one or more checks being performed to determine whether the first device is a threat to the system. The one or more processors further configured to communicate a first permanent key from the plurality of stored permanent keys to the first device if the first device passes the first set of one or more checks, the first permanent key having an expiration date. The interface is further configured to receive, from the first device a request for a new permanent key from the plurality of stored keys at a time subsequent to the communication of the first permanent key.

Certain embodiments may provide one or more technical advantages. For example, an embodiment of the present disclosure provides an end-to-end encryption management solution. As another example, an embodiment of the present disclosure provides security measures such as compatibility checks, validation checks, and/or verification checks prior to the provisioning of encryption keys. As yet another example, an embodiment of the present disclosure tracks the life cycle of distributed keys and provides automatic renewal for keys at the end of their life cycle, thereby providing users with continuous access to transmitting information securely. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Embodiments of the present disclosure and its advantages are best understood by referring to FIGS. 1 through 4 of the drawings, like numerals being used for like and corresponding parts of the various drawings.

Transmitting information over a network may put that information at risk. For example, an unauthorized recipient may intercept the information and use it in a way that conflicts with the interests of the sending or intended party. To manage the risk of transmitting sensitive information over a network, enterprises and/or other users may encrypt the information prior to transmission. Generally, encryption of information uses an encryption key to convert the information from a user-readable format to a non user-readable format (also referred to as an encrypted format). An encryption key may also be used to re-convert the information from the encrypted format to a user-readable format. Accordingly, encryption keys are distributed to persons authorized to access the encrypted information and precautions may be taken to prevent the distribution of encryption keys to unauthorized parties.

Encryption keys are usually generated by encryption systems that manage the distribution of the keys. Encryption keys generated by conventional encryption systems are typically associated with an expiration date as an additional security measure. As such, an encryption key may be used to encrypt/decrypt information for a particular period of time and will become inoperable after the period of time has passed. In such a scenario, a user desiring to encrypt information may need to request a new encryption key from the encryption system, thereby resulting in a delay of information transmission.

Another disadvantage of conventional encryption systems is that they do not provide an end-to-end solution for key management. Rather, conventional encryption systems provide particular management functionality. For example, some conventional key management systems provide for the generation, distribution, and storage of keys while others may provide for the destruction of keys. Conventional key management solutions typically are not end-to-end solutions because organizations that utilize key management systems have different management concerns and/or different security requirements.

One other disadvantage of conventional encryption systems is that they do not typically include security controls. For example, conventional encryptions systems do not perform checks on the devices that use the encryption system. This lack of examination can also lead to security concerns. For example, an unauthorized device may be given access to the encryption system. As another example, an encryption key may be provisioned to a device that is not compatible with the encryption system. As yet another example, the encryption system may permit devices that could harm or otherwise threaten the encryption system to access and transmit information using keys generated by the encryption system. Although this disclosure describes particular concerns of conventional encryption systems lacking security controls, this disclosure recognizes that there may be other security concerns not addressed by conventional encryption systems.

This disclosure contemplates a single encryption system that provides an end-to-end solution for key management. The encryption system verifies compatibility of unknown devices, assesses whether devices are threats to the key management system, provisions keys to compatible and/or non-threatening devices, tracks keys during the life cycles, and renews keys to devices upon key expiration. Using a system of this kind may be associated with various benefits including, inter alia, providing a single system that provides a renewal mechanism for keys nearing expiration such that information may be securely transferred even after the expiration of a security key. In some embodiments, keys are renewed only if the device associated with the expiring key is still compatible with the key management system and/or if the device associated with the expiring key is still not a threat to the key management system. Thus, the encryption system improves underlying encryption technology by adding security controls and providing devices with continuous access to encryption keys.

Figure 1:
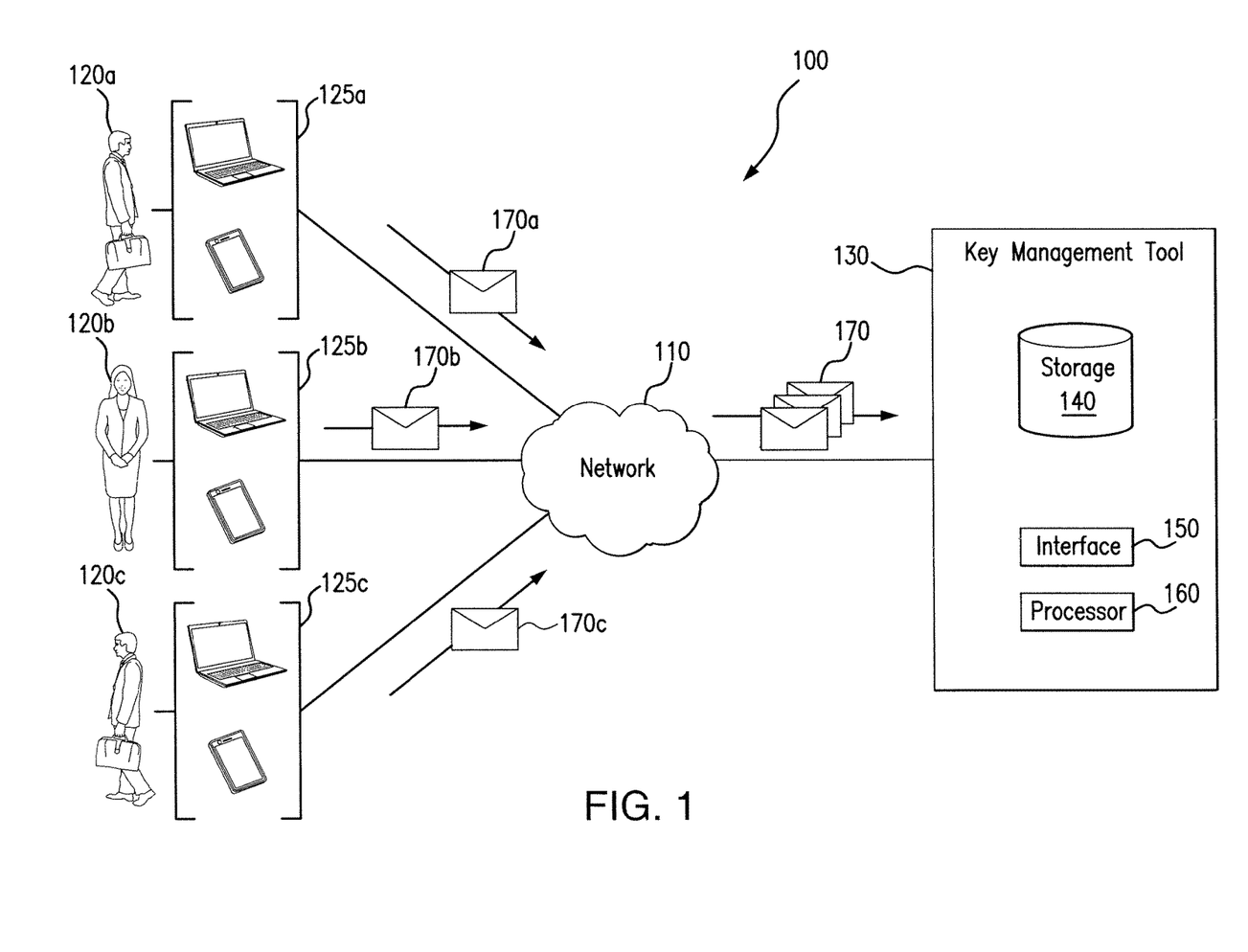
FIG. 1 is a block diagram illustrating a network environment for a key management tool, according to certain embodiments.

FIG. 1 illustrates a network environment 100 for a key management tool 130. As illustrated in FIG. 1, network environment 100 includes a network 110, one or more users 120, devices 125, and a key management tool 130. Generally, key management tool 130 provides an end-to-end solution for managing keys to securely transmit information between and amongst users 170.

Network 110 may facilitate the transmission of information between end users 120 and key management tool 130. This disclosure contemplates network 110 being any suitable network operable to facilitate communication between the components of network environment 100. For example, network 110 may permit users 120 to send communications 170 to key management tool 130 over network 110. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As described above, network environment 100 may include one or more users 120 in some embodiments. As depicted in FIG. 1, network environment 100 includes three users 120a, 120b, and 120c. As is also depicted in FIG. 1, each user 120 is associated with one or more devices 125. For example, user 120a is associated with devices 125a, user 120b is associated with devices 125b, and user 120c is associated with devices 125c. In some embodiments, users 120 use devices 125 to send and/or receive information over network 110. As illustrated in FIG. 1, users 120 send and receive communications 170a over network 110. Depending on whether a user 120 is known to key management tool 130, communications 170 may be secure or unsecure. As used herein, a user is known to key management tool 130 when the device 125 has previously communicated with key management tool 130, and a device 125 is unknown to key management tool 130 when the device 125 has not previously communicated with the key management tool 130. Additionally, communications 170 of a user 120 may be secure when key management tool 130 is familiar with user 120, and communications 170 of a user 120 may be unsecure when key management tool 130 is unfamiliar with user 120. As used herein, a communication 170 is secure when it is encrypted and requires a key to decrypt it, and a communication 170 is unsecure when no key it is not encrypted and/or does not require a key to decrypt it.

This disclosure recognizes that a user 120 may become known or unknown to key management tool 130. For example, user 120a may be unknown to key management tool 130 at Time X and subsequently become known to key management tool 130 at Time Y. In such an example, communications 170a of user 120a may be unsecure until Time Y when user 120a becomes known to key management tool 130. Such an example may arise when user 120a decides to send secure communications 170 (rather than unsecure communications). As another example, user 120b may be known to key management tool 130 at Time X and subsequently become unknown to key management tool 130 at Time Y. Such an example may arise when a key associated with user 120b expires and attributes and/or credentials of device 125 are not the same at Time Y as they were at Time X. In such an example, user 125b may transmit secure communications 170b during Time X and unsecure communications 170b beginning at Time Y.

Communication 170 may include one or more portions of information. In some embodiments, communication 170 may include one or more attributes and/or one or more credentials of the device 125 sending the communication 170. As used herein, an attribute may be or include a specification and/or a capability of a device 125 and a credential may be or include identifying information about a device 125. In some embodiments, one or more engines of key management tool 130 uses the attribute and/or credential information of communication 170 to determine whether to distribute a temporary key 270 and/or permanent key 272 to the device associated with communication 170.

Device 125 may be any appropriate device that can communicate over network 110. For example, device 125 may be a computer, a laptop, a wireless or cellular telephone, an electronic notebook, a personal digital assistant, a tablet, a server, a mainframe, or any other device capable of receiving, processing, storing, and/or communicating information with other components of network environment 100. Device 125 may also include a user interface, such as a display, a microphone, keypad, or other appropriate terminal equipment usable by a user. In some embodiments, an application executed by device 125 may perform the functions described herein.

Figure 2:
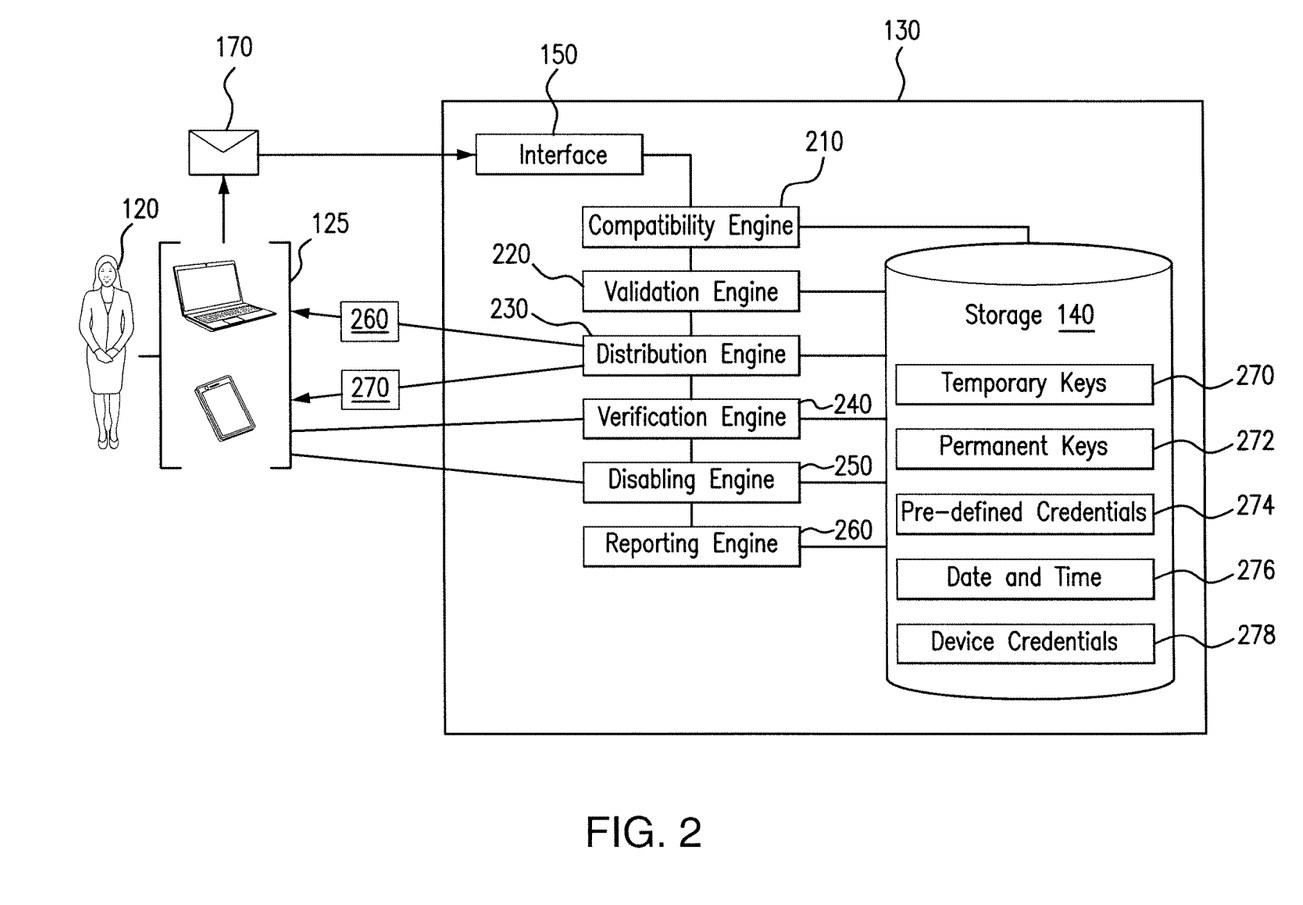
FIG. 2 is a block diagram illustrating the key management tool of FIG. 1, according to certain embodiments.

As described above, network environment 100 includes key management tool 130. In some embodiments, key management tool 130 includes a memory, an interface, and one or more processors. As illustrated in FIG. 1, key management tool 130 includes storage 140, interface 150, and processor 160. Key management tool 130 is a special purpose computer in some embodiments. For example, key management tool 130 may be a computer such as computer 400 of FIG. 4 but be specially programmed to execute functionality described herein. As will be described in more detail below, key management tool 130 may include one or more engines. For example, as illustrated in FIG. 2, key management tool 130 includes a compatibility engine 210, a validation engine 220, a distribution engine 230, a verification engine 240, and a disabling engine 250. Each engine of key management tool 130 may be code stored to storage 140 and executable by processor 150.

Generally, key management tool 130 is an end-to-end key management system. As used herein, an end-to-end key management system includes the distribution of keys for encrypting/decrypting information to devices, tracking the life cycle of the distributed keys, and distributing new keys to the devices upon determining that the device to which a new key is to be distributed is compatible, valid, and verified. Key management tool 130 is configured to receive communications 170 from one or devices 125 associated with one or more users 120. In some embodiments, the component of key management tool 130 that receives communications 170 is interface 150. Key management tool 130 may be further configured to determine whether to distribute one or more keys to the one or more devices that sent communications 170. As will be described in further detail below, key management tool 130 may be configured to distribute temporary keys and/or permanent keys. Temporary keys and permanent keys may be used to encrypt and/or decrypt communications 170. In some embodiments, encrypting a communication 170 with a temporary key permits a user 120 to transmit secure communications to key management tool 130. In other embodiments, encrypting a communication 170 with a permanent key permits a user 120 to transmit secure communications to other users 120.

FIG. 2 illustrates a user 120 interacting with key management tool 130. Generally, FIG. 2 shows interface 150 of key management tool 130 receiving a communication 170 from device 125 and key management tool 130 distributing a temporary key 270 and a permanent key 272 to the device 125 that sent communication 170. In some embodiments, the distribution of keys (e.g., temporary keys 270, permanent keys 272) is based on one or more determinations of key management tool 130. Temporary keys 270 and/or permanent keys 272 may be distributed based on determinations made by various engines of key management tool 130. As an example, a temporary key 270 may be distributed to user device 125 only if compatibility engine 210 determines that device 125 is compatible with key management tool 130. As another example, a permanent key 272 may only be distributed to device 125 if it passes one or more checks performed by verification engine 240.

As illustrated in FIG. 2, key management tool includes interface 150, storage 140, and one or more engines (e.g., engines 210-250). Interface 150 is configured to receive information (e.g., communications 170) from one or more devices 125. The received information may be sent securely or unsecurely from devices 125. As explained above, information may be sent securely to key management tool 130 when it is encrypted using a temporary key 270 and may be sent unsecurely to key management tool 130 when it is not encrypted. In some embodiments, interface 150 may receive a first unsecure communication 170 from device 125 and subsequently (e.g., after one or more temporary keys 270 have been distributed to device 125) receive a first secure communication 170 from device 125. At some point after receiving the first secure communication 170, interface 150 may receive a second unsecure communication 170 from device 125. In some embodiments, interface 150 receives a second unsecure communication 170 from device 125 at or around the time of an expiration date associated with a permanent key 272 distributed to device 125. For example, interface 150 may receive a second unsecure communication 170 from device 125 one week before the expiration date of the permanent key 272 distributed to device 125 to facilitate secure communication between device 125 and other devices 125. As will be explained in more detail below, receipt of a second unsecure communication 170 may initiate the process of issuing one or more new keys (e.g., temporary key 270, permanent key 272) to device 125.

Key management tool 130 may also include storage 140. Storage 140 may be temporary storage and/or permanent storage. In some embodiments, storage 140 is configured to store information. In some embodiments, such as the embodiment illustrated in FIG. 2, storage 140 stores a plurality of temporary keys 270, a plurality of permanent keys 272, pre-defined credentials 274, date and time information 276, and device credentials 278. As described above, a temporary key 270 may be distributed to a device 125 to permit the encryption of communication 170 such that the communication 170 is sent securely over network 110 to key management tool 130. In some embodiments, temporary keys 270 include both public temporary keys and private temporary keys. A public temporary key may permit a device 125 to securely send communications to certain components of key management tool 130. For example, device 125 may encrypt communications 170 with a public temporary key 270 in order to send secure communications to top-layer engines of key management tool 130. A private temporary key may permit a device 125 to securely send communications to all components of key management tool 130. For example, device 125 may encrypt communications 170 with a private temporary key 270 in order to send communications to low-level engines of key management tool 130. As was also described above, a permanent key 272 may be distributed to a device 125 to permit the encryption of communication 170 such that the communication 170 is sent securely over network 110 to other user devices 125. In some embodiments, the distribution of temporary keys 270 and/or permanent keys 272 is performed by distribution engine 230.

Storage 140 may also be configured to store an indication as to whether a particular one of the temporary keys 270 and/or the permanent keys 272 has been distributed to a device 125. For example, storage 140 may include an entry for a first temporary key (e.g., temporary key 270a (not illustrated)) and may also store an indication as to whether that key has been distributed to a device 125. In some embodiments, key management tool 130 determines whether to distribute a particular key based on its corresponding distribution indication. For example, if the corresponding distribution indication for first temporary key 270a indicates that it has previously been distributed to device 125a, key management tool 130 may determine that first temporary key 270a cannot be distributed to device 125b. Alternatively, if the corresponding distribution indication for first temporary key 270a indicates that it has not been distributed to any device 125, key management tool 130 may determine that first temporary key 270a can be distributed to device 12b.

Storage 140 may also store date and time information 276 in some embodiments. As used herein, date and time information 276 refers to date and time information associated with the generation and distribution of keys. For example, storage 140 may store, as date and time information 276, one or more entries identifying a key (e.g., a public/private temporary key 270 and/or a permanent key 272) and the date and time that such identified key was generated and/or distributed. In some embodiments, date and time information 276 entries may also include an identification as to the device associated with the generated and distributed key. As an example, storage 140 may store the information provided below in TABLE 1 as date and time information 276:

TABLE 1

| Key Identifier | Generation Date/Time | Distribution Date/Time | Associated Device |
|---|---|---|---|
| 270a | Jan. 1, 2017, 12:01:01 | Jan. 1, 2017, 12:01:03 | 125a |
| 272b | Jan. 1, 2017 12:05:10 | Jan. 1, 2017, 12:05:15 | 125a |
| 270b | Jan. 10, 2017, 12:01:01 | Jan. 10, 2017, 12:01:03 | 125b |
| 272b | Jan. 10, 2017, 12:05:10 | Jan. 10, 2017, 12:05:10 | 125b |

In some embodiments, storage 140 may also store device credentials 278. As will be explained in further detail below, key management tool 130 may receive credentials associated with a device 125 (also referred to herein as "device credentials"). In some embodiments, device credentials are received within communication 170. The device credentials may be stored in storage 140. For example, validation engine 220 may identify, within communication 170, device credentials and send the device credentials to storage 140 for storage. In some embodiments, device credentials 278 may subsequently be retrieved from storage 140 by one or more engines of key management tool 130. For example, validation engine 220 and reporting engine 260 may subsequently retrieve device credentials 278 from storage 140.

For ease of understanding, this disclosure describes and depicts all information stored to a single storage device 140. However, this disclosure recognizes that key management tool 140 may include one or more other storage devices. For example, key management tool 130 may include a temporary storage device such as a memory and/or a permanent storage device such as a hard drive, solid state drive, floppy disk, CD-ROM, or USB flash drive. In some embodiments, key management tool 130 includes both a temporary storage device and a permanent storage device (see e.g., computer 400 of FIG. 4). In such an embodiment, the temporary storage device may store some, but not all, of the information described and depicted in FIG. 2. For example, storage 140 may store temporary keys 270 and pre-defined credentials 274 but not permanent keys 272, date and time information 276, and device credentials 278. In such an example, permanent keys 272, date and time information 276, and device credentials 278 may be stored in a more permanent storage device such as a disk (not illustrated).

In some embodiments, each permanent key 272 is associated with an expiration date. The expiration date associated with a permanent key 272 may indicate the date upon which the permanent key 272 can no longer encrypt communications 170. For example, a first permanent key associated with an expiration date of Jan. 1, 2018 may be distributed to a device 125 (e.g., by distribution engine 230). The device 125 to which the first permanent key is distributed may encrypt communications 170 using the first permanent key until the expiration date (Dec. 31, 2017). On and/or after the expiration date, the first permanent key cannot encrypt communications 125. In some embodiments, the expiration date associated with each permanent key 280 is also stored in storage 140.

In some embodiments, storage 140 may also store one or more pre-defined credentials 274. Pre-defined credentials 274 may be credentials that are used to validate a device 125. In some embodiments, the validation of a device 125 is performed by validation engine 220. Validation of a device 125 may include comparing credentials of a device 125 to one or more of the stored pre-defined credentials. For example, communication 170 may include credentials associated with a particular device 125 and/or user 120. Upon receiving the communication 170, key management tool 130 may compare the credentials of the device 125 and/or user 120 to one or more of the pre-defined credentials in storage 140. In some embodiments, if the credentials of communication 170 match, correspond, or otherwise agree with pre-defined credentials 274, key management tool 130 determines that device 125 is validated. For example, communication 170 may include credentials that indicate an email address associated with a device 125 that includes a particular domain name. Upon receiving communication 170, key management tool 130 may compare the domain name included in the received communication 170 to domains stored as pre-defined credentials 274. Although this disclosure describes a domain name as an example of a type of pre-defined credential 274, this disclosure recognizes that pre-defined credentials 274 may be any suitable information that may be used to validate a device 125 and/or user 120. For example, pre-defined credentials 274 may include any unique identifier of device 125 (e.g., an IP address associated with device 125, a CPU serial number) and/or user 120 (e.g., user ID associated with user 120). Validation of such unique identifier may be executed in the form of a passphrase or other key/code known only to device 125 and key management tool 130. Without such information, key management tool 130 may determine that device 125 sending communication 170 is not valid and further communications with device 125 will be terminated.

As described above, key management tool 130 may include one or more engines. As illustrated in FIG. 2, key management tool 130 includes compatibility engine 210, validation engine 220, distribution engine, 230, verification engine 240, disabling engine 250, and reporting engine 260. Various functionalities of each of these engines will be described in turn below.

Key management tool 130 may include compatibility engine 210 in some embodiments. Compatibility engine 210 may be configured to determine whether a particular device 125 is compatible with key management tool 130. In some embodiments, a device 125 is compatible with key management tool 130 if the device 125 can send and receive secure communications with key management tool 130. Compatibility engine 210 may determine whether a device 125 is compatible with key management tool 130 based on the attributes of the device 125 sending communication 170. For example, compatibility engine 210 may determine that device 125a is compatible with key management tool 130 based on attributes in communication 170a. As another example, compatibility engine 210 may determine that device 125b is not compatible with key management tool 130 based on attributes in communication 170b. In some embodiments, compatibility engine 210 determines whether device 125 is compatible with key management tool 130 by comparing the attributes of device 125 to compatibility requirements that may be stored in storage 140. An example algorithm for compatibility engine 210 may be: (1) identify, within communication 170, attributes of device 125; (2) retrieve compatibility requirements (not illustrated) from storage 140; (3) compare the identified attributes of device 125 to compatibility requirements; (4) determine, based on the comparison, whether device 125 is compatible with key management tool 130.

In some embodiments, key management tool 130 includes validation engine 220. As described above, validation engine 220 may be configured to validate a device 125 based on the received credentials of a device 125. As used herein, validating device 125 may refer to determining whether a device is authorized to communicate with key management tool 130. Credentials of a device 125 may be one portion of information included in communication 170. In some embodiments, validating the first device comprises comparing the received credentials of device 125 to one or more of stored pre-defined credentials 274. For example, device 125c may send communication 170c including credentials (e.g., login information) to key management tool 130. In such an example, validation engine 220 may compare the received login information associated with device 125 to pre-defined credentials 274 stored in storage 140. If the login information associated with device 125 matches, corresponds to, or otherwise agrees with pre-defined credentials 274, validation engine 220 may determine that the device 125c is valid. In this manner, validation engine 220 may validate device 125c. In some embodiments, validation engine 220 is also configured to store, to storage 140, the credentials received from device 125. The stored credentials may be stored to storage 140 as device credentials 278. In other embodiments, other components of key management tool 130 stores device credentials 278. For example, interface 150 and/or compatibility engine 210 may be configured to store the credentials received from device 125 to storage 140. An example algorithm for validation engine 220 may be: (1) identify, within communication 170, credentials of device 125; (2) retrieve pre-defined credentials 274 from storage 140; (3) compare the identified credentials of device 125 to pre-defined credentials 274; (4) determine, based on the comparison, whether device 125 is authorized to communicate with key management tool 130.

Key management tool 130 includes distribution engine 230 in some embodiments. Distribution engine 230 may be configured to distribute one or more keys. For example, distribution engine 230 may be configured to distribute one or more temporary keys 270 and/or one or more permanent keys 272. Distribution engine 230 may be configured to distribute both a temporary key 270 and a permanent key 272 to one or more devices 125. In some embodiments, distribution engine 230 uses information included in communication 170 to determine which device 125 to send keys (e.g., temporary keys 270, permanent keys 272) to. In some embodiments, distribution engine 240 keeps track of the time and date of generation and/or distribution of keys, as well as the device 125 to which a key is distributed. For example, distribution engine 230 may be configured to determine the information provided in TABLE 1 above and to store the information provided in TABLE 1 to storage 140 as date and time information 276.

As illustrated in FIG. 2, distribution engine 230 distributes both a temporary key 270 and a permanent key 272 to device 125. In some embodiments, the distribution of a temporary key 270 may turn on whether a device 125 is validated by validation engine 220. For example, distribution engine 230 may distribute one or more of the plurality of temporary keys 270 stored in storage 140 to device 125 upon determining that device 125 has been validated by validation engine 220. As explained above, distribution engine 230 may be configured to distribute public temporary keys and private temporary keys. Distribution of a public temporary key or a private temporary key may be determined based on whether a device is verified by verification engine 240. For example, distribution engine 230 may distribute a public temporary key 270 to device 125 upon determining that device 125 is valid and distribute a private temporary key 270 to device 125 upon determining that device 125 is verified. In some embodiments, distribution of a private temporary key 270 may precede the distribution of a permanent key 272.

In some embodiments, the distribution of a permanent key 272 turns on whether a device is verified by verification engine 240. For example, distribution engine 230 may distribute one of the plurality of permanent keys 272 stored in storage 140 to device 125 upon determining that device 125 has been verified by verification engine 240. An example algorithm for distribution engine 230 may be: (1) receive, from validation engine 210, a notification that device 125 has been validated; (2) in response to receiving the notification that device 125 has been validated, retrieve, from storage 140, a temporary key (e.g., key 260a) of the stored plurality of temporary keys 270; (3) communicate the retrieved temporary key (e.g., key 260a) to device 125; (4) receive, from verification engine 240, a notification that device 125 has been verified; (5) in response to receiving the notification that device 125 has been verified, retrieve, from storage 140, a permanent key (e.g., key 270a) of the stored plurality of permanent keys 272; and (6) communicate the retrieved permanent key (e.g., 270a) to device 125. In some embodiments, key management tool 130 includes verification engine 240. Verification engine 240 may be configured to perform one or more checks on one or more devices 125. As an example, verification engine 240 may perform one or more checks on the device associated with a received communication 170. In some embodiments, the one or more checks performed by verification engine 240 are performed in order to determine whether a device 125 is a threat. As used herein, a device 125 is a threat if it is capable of and/or configured to put a component of network environment 100 at risk. For example, a device 125 is a threat if it jeopardizes the security of the information (e.g., contents of communications 170) being transmitted over network 110. In some embodiments, verification engine 240 performs the one or more checks on device 125 after distributing a temporary key 250 to device 125. The one or more checks performed may be based on attributes and/or credentials of device 125 in some embodiments. For example, key management tool 130 may be configured to perform checks 1-5 on devices 125 associated with a first organization and perform checks 6-10 on devices 125 associated with a second organization. In some embodiments, determining whether to perform a particular check on device 125 is based on verification data stored in storage 140. For example, verification data may include an entry corresponding to the first organization and indicating that checks 1-5 are to be performed on devices associated with the first organization. An example algorithm for verification engine 240 may be: (1) identify, within communication 170, attributes of device 125; (2) determine, based on identified attributes of device 125, an organization associated with device 125; (3) query storage 140 for verification data corresponding to the organization associated with device 125; (4) perform, on device 125, one or more checks indicated by the verification data corresponding to the organization associated with device 125.

Some embodiments of key management tool 130 also include disabling engine 250. Disabling engine 250 may be configured to disable one or more keys. As an example, disabling engine 250 may be configured to disable temporary keys 270 and/or permanent keys 272. A key may be disabled permanently or temporarily. For example, disabling engine 250 may disable a key for a specified period of time (e.g., 2 weeks, 2 months, 2 years). As another example, disabling engine 250 may disabling a key permanently such that a key that is communicated to device 125 may never be communicated to another device in the future. In some embodiments, disabling a key may include changing a status of a key from enabled to disabled. In such an embodiment, storage 140 may include an indicating of key status corresponding to a particular key (e.g., key 260b may be associated with the status "enabled" and key 270b may be associated with the status "disabled"). In some embodiments, disabling engine 250 disables a temporary key 270 distributed to a device 125 upon distributing a permanent key 272 to the same device. As an example, disabling engine 250 may disable a temporary key 270 distributed to device 125a upon distributing a permanent key 272 to device 125a. In such an example, device 125a may no longer be able to securely communicate with key management tool 30 using temporary key 270 after temporary key 270 has been disabled. In other embodiments, disabling engine 250 disables permanent keys distributed to device 125 upon determining that the expiration date corresponding to the distributed permanent key has been reached. For example, disabling engine 250 may disable a permanent key 272a having a Jan. 1, 2018 expiration date upon determining that the date is Jan. 1, 2018. In some other embodiments, disabling engine 250 may disable both temporary keys 270 and permanent keys 272. Disabling a key (e.g., temporary key 270 and/or permanent key 272) may, in some embodiments, require retiring and/or rendering the key inoperable such that they key can no longer be used to encrypt communications 170. An example algorithm for disabling engine 250 may be: (1) receive, from distribution engine, identifying information about a temporary key (e.g., 260a) communicated to device 125; (2) receive, from distribution engine 260, a notification that a permanent key (e.g., 270a) has been communicated to device 125; (2) in response to receiving the notification that permanent key 260a has been communicated to device 125, disable temporary key 270a such that device 125 can no longer send secure communications to key management tool 130; and (3) update, in memory, the status associated with key 260a from "enabled" to "disabled."

Key management tool 130 may also include reporting engine 260 in some embodiments. Reporting engine 260 may be configured to communicate with other components of key management tool 130. For example, reporting engine 260 may be configured to communicate with storage 140 and/or disabling engine 250. Additionally, reporting engine 260 may be configured to communicate with one or more devices 125. As an example, reporting engine 260 may be configured to communicate with a device 125 operated by an administrator of key management tool 130. Reporting engine 260 may be configured to access information associated with components of key management tool 130 and collate the information in a usable format for use in analytics and/or governance controls. As a particular example, reporting engine 260 may track whether a particular device 125 renewed keys upon expiration of a distributed permanent key 262. If the device 125 did not receive a permanent key following the expiration of the distributed permanent key 262, reporting engine 260 may report this information to an administrator of key management tool 130, prompting him/her to investigate why device 125 did not receive a permanent key following the expiration of the distributed permanent key 262. Although this disclosure describes a particular application for the usage of data collected and/or stored by key management tool 130, this disclosure recognizes that reporting engine 260 may be configured to detect and report on any event of interest.

A typical cycle of key management tool 130 may proceed as follows: interface 150 receives an unsecure communication 170 from device 125. Interface 125 may relay the unsecure communication 170 itself and/or portions of the unsecure communication 170 (e.g., attribute(s) of device 125) to compatibility engine 210. In some instances, communication 170 is relayed to another engine (e.g., engines 220-250) only after a first engine determines that another engine's determination is required. For example, interface 170 and/or compatibility engine 210 may be configured to relay communication 170 (or a portion thereof) to validation engine 220 only upon a determination by compatibility engine 210 that device 125 is compatible with key management tool 130. As another example, interface 170 and/or validation engine 220 may be configured to relay communication 170 (or a portion thereof) to distribution engine only upon a determination by validation engine 220 that device 125 is validated. In some embodiments, upon compatibility engine 210 receiving communication 170 (or a portion thereof), compatibility engine 210 determines, based on one or more attributes of device 125, whether device 125 is compatible with key management tool 130. In some embodiments, upon validation engine 220 receiving communication 170 (or a portion thereof), validation engine 210 determines, based on credentials of device 125, whether device 125 is validated. Upon a determination that device 125 is compatible with key management tool 130 and that device 125 is validated, interface 150 may relay communication 170 (or a portion thereof) to distribution engine 230 so that distribution engine 230 can send a temporary key 270 to device 125.

Device 125 may use the distributed temporary key 270 to securely communicate with key management tool 130. As an example, device 125 may communicate with key management tool 130 when responding to the various checks performed by verification engine 240. In some embodiments, communication 170 (or portions thereof) is relayed to verification engine 240 only after distribution engine 230 distributes temporary key 270. Upon determining that device 125 passes the one or more checks performed by verification engine 240, distribution engine 230 may distribute a permanent key 272 to device 125. In some embodiments, communication 170 (or portions thereof) is relayed to disabling engine 250 only after a determination that a permanent key 272 has been distributed to device 125. Disabling engine 250 may use the information provided by communication 170 and/or another engine (e.g., distribution engine 230 or verification engine 240) to determine which keys (e.g., temporary keys 270 and/or permanent keys 272) to disable or otherwise render inoperable.

Although the above cycle example described the relay of communication 170 (or portions of communication 170) to each engine based on another engine's determination about device 125, this disclosure recognizes that interface 170 may send communication 170 to each engine of key management tool 170 in parallel. Various benefits may be realized by providing the communication 170 to more than one engine at a time. As an example, providing the communication 170 to more than one engine of key management tool 170 may permit the engines to process the communication in parallel, thereby decreasing the time it takes to distribute one or more of the temporary keys 270 and/or permanent keys 272.

Figure 3:
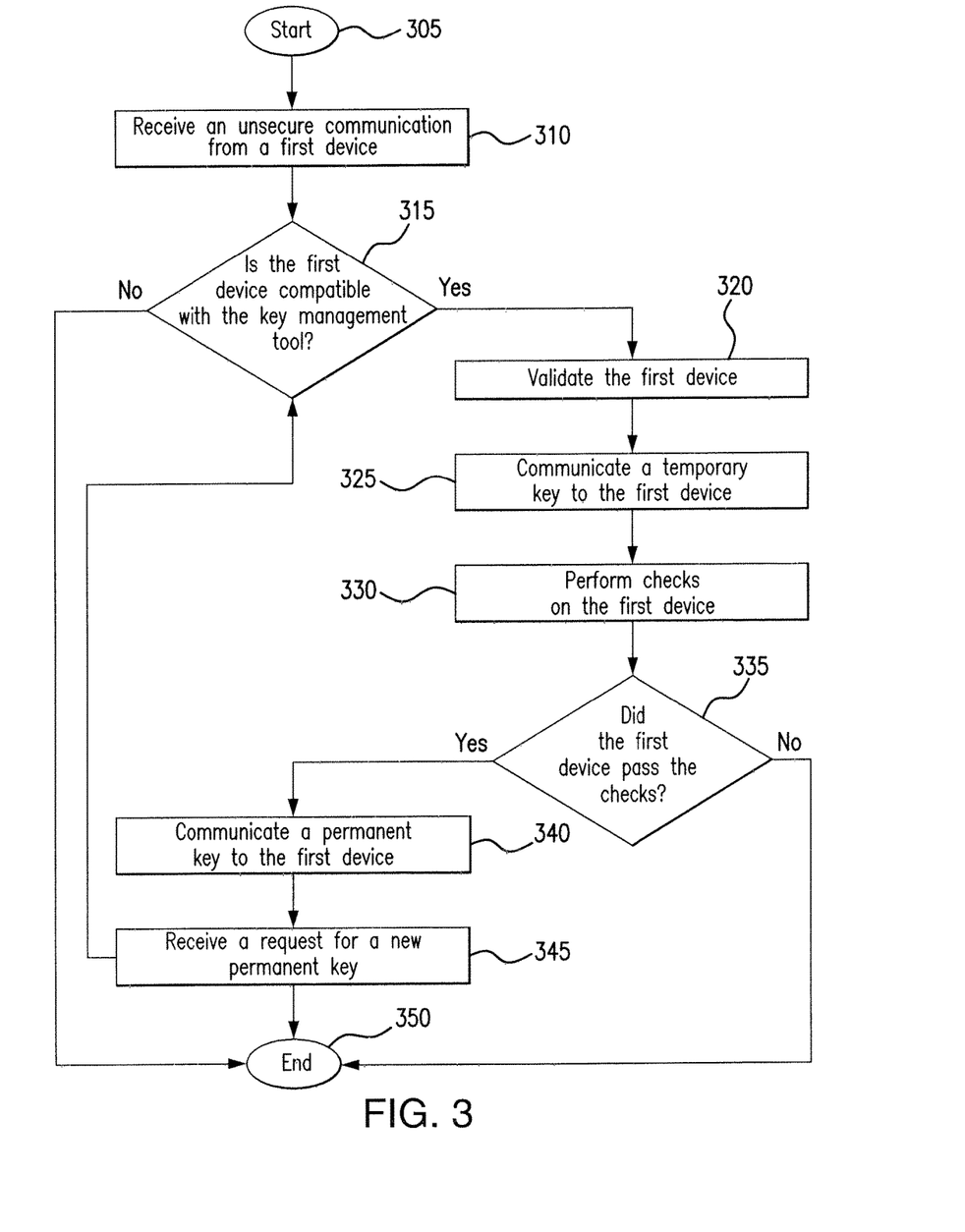
FIG. 3 is a flow chart illustrating a method for key management using the key management tool of FIG. 2, according to one embodiment of the present disclosure.

FIG. 3 illustrates a method 300 which may be performed by key management tool 130. In some embodiments, some or all of the steps of method 300 are performed by one or more engines of key management tool 130. Method 300 may be an algorithm stored to storage 140 of key management tool 130 and may be executable by processor 160 of key management tool 130. The method 300 may begin in a step 305 and continue to a step 310. At step 310, key management tool 130 receives a communication 170. The communication 170 may be received from a first device that is unknown to key management tool 130. The communication 170 received at step 310 may also be unsecure. In some embodiments, interface 150 is the component of key management tool 130 that receives communication 170. In some embodiments, the communication 170 received at step 310 may include one or more of attributes of a device 125 and/or credentials of a device 125. In some embodiments, after receiving the communication 170 at step 310, the method 300 continues to a decision step 315.

At step 315, the key management tool 130 determines whether the device 125 that sent communication 170 is compatible with key management tool 130. In some embodiments, the component that makes this compatibility determination is compatibility engine 210. In some embodiments, a determination as to whether device 125 is compatible is based on the attributes of communication 170. If key management tool 130 determines that the device 125 that sent communication 170 is not compatible with key management system 130, the method 300 may proceed to end step 250. Alternatively, if key management tool 130 determines at step 35 that the device 125 that sent communication 170 is compatible with key management system 130, the method 300 may proceed to step 320.

At step 320, key management tool 130 validate the device 125 that sent communication 170. In some embodiments, the component of key management tool 130 configured to validate device 125 is validation engine 220. Validation of device 125 may be based on credentials of communication 170. In some embodiments, validating device 125 includes comparing the credentials of communication 170 to predefined credentials stored in storage 140. If key management tool 130 validates device 125 at step 320, the method 300 proceeds to step 325.

At step 325, key management tool 130 communicates a temporary key 270 to device 125. In some embodiments, the component of key management tool 130 that communicates temporary key 270 to device 125 is distribution engine 230. As explained above, the temporary key 270 distributed by distribution engine 230 may be a public or a private temporary key. In some instances, distribution engine 230 may distribute both a public and a private temporary key. In some embodiments, the temporary key 270 that is distributed to device 125 is one of a plurality of temporary keys 270 stored in storage 140. In some embodiments, the temporary key 270 communicated to device 125 is subsequently disabled upon a determination that a permanent key has been communicated to device 125. As explained above, the temporary key 270 communicated to device 125 may be used to encrypt communications 170 between device 125 and key management tool 130. In some embodiments, the method 300 proceeds to step 330 after temporary key 270 is communicated to device 125.

At step 330, key management tool 130 performs one or more checks on device 125. In some embodiments, the one or more checks are performed by verification engine 240 of key management tool 130. The one or more checks may be performed in order to determine whether device 125 presents a threat to one or more components of network environment 100. In some embodiments, the method 300 proceeds to a decision step 335 after the one or more checks are performed at step 330.

At step 335, key management tool 130 determines whether device 125 passed the one or more checks. In some embodiments, verification engine 240 is the component of key management tool 130 that makes this determination. If key management tool 130 determines at step 335 that device 125 did not pass one or more of the checks performed during step 330, the method 300 may proceed to end step 350. Alternatively, if key management tool 130 determines that device 125 passed the checks performed at step 330, the method 300 proceeds to step 340.

At step 340, key management tool 130 communicates a permanent key 272 to device 125. In some embodiments, the component of key management tool 130 that distributes permanent key 272 is distribution engine 230. As described above, permanent key 272 may be utilized by device 125 to encrypt communications 170 to one or more other devices 125 over network 110. In some embodiments, the permanent key 272 distributed to device 125 is associated with an expiration date that mandates the date upon which the distributed permanent key 272 is rendered inoperable. As such, device 125 may utilize permanent key 272 to send secure communications 170 over network 110 until the expiration date associated with permanent key 272. In some embodiments, the method 300 proceeds to step 345.

At step 345, key management tool 130 receives a request from device 125 for a new permanent key. In some embodiments, the component of key management tool 130 that receives this request is interface 150. In some embodiments, the request for a new permanent key may occur on the expiration date associated with the permanent key 272 distributed at step 340. In other embodiments, the request for a new permanent key may occur at a time prior to the expiration date associated with the permanent key 272. As an example, the request for a new permanent key may occur at a time set by an administrator of key management tool 130 (e.g., one week prior to the expiration date associated with the permanent key 272 distributed at step 240). In embodiments, the request for a new permanent key is sent manually. In some other embodiments, the request for a new permanent key is sent automatically. In such an embodiment, the request for a new permanent key may be sent automatically based on the expiration date associated with the permanent key 272 distributed at step 340. In some embodiments, the request for a new permanent key may include one or more of attributes and/or credentials of the device 125 that sent the request. The attributes and/or credentials included in the first request may be used by key management tool 130 to facilitate the distribution of additional keys (e.g., temporary keys 270 and/or permanent keys 272). In some embodiments, the method 300 proceeds to end step 350 after receiving a request for a new permanent key. In other embodiments, the method 300 returns to step 315.

If the method 300 returns to a step 315, key management tool 130 uses the attribute information included in the request received at step 345 to determine whether device 125 is compatible with key management tool 130. If key management tool 130 determines that device 125 is not compatible based on the attributes received in the request for a new permanent key (received at step 345), the method 300 proceeds to end step 350. Alternatively, the method 300 continues to step 320 if key management tool 130 determines that device 125 is compatible based on the attributes of device 125 received in the request for the new permanent key 272 (received at step 345). At step 320, key management tool 130 validates device 125 using credentials received in the request for the new permanent key (received at step 345). If device 125 is able to be validated based on the credentials received at step 345, the method 300 proceeds to a step 325 where a second temporary key 270 is communicated to device 125. Thereafter, key management tool 130 may securely communicate (using the second temporary key 270) with device 125 to perform one or more checks on device 125 and to determine whether the device passed the one or more checks (steps 330 and 335). Upon determining that device 125 passed the one or more checks, the method 300 may proceed to a step 340 where key management tool 130 communicates a second permanent key 270 to device 125. The second permanent key 272 may be associated with an expiration date that is later in time than the expiration date associated with the first permanent key 272. The method 300 can continue to cycle in a similar manner one or more times such that keys are delivered into perpetuity so long as the device requesting keys is compatible, validated, and verified by key management tool 130.

Figure 4:
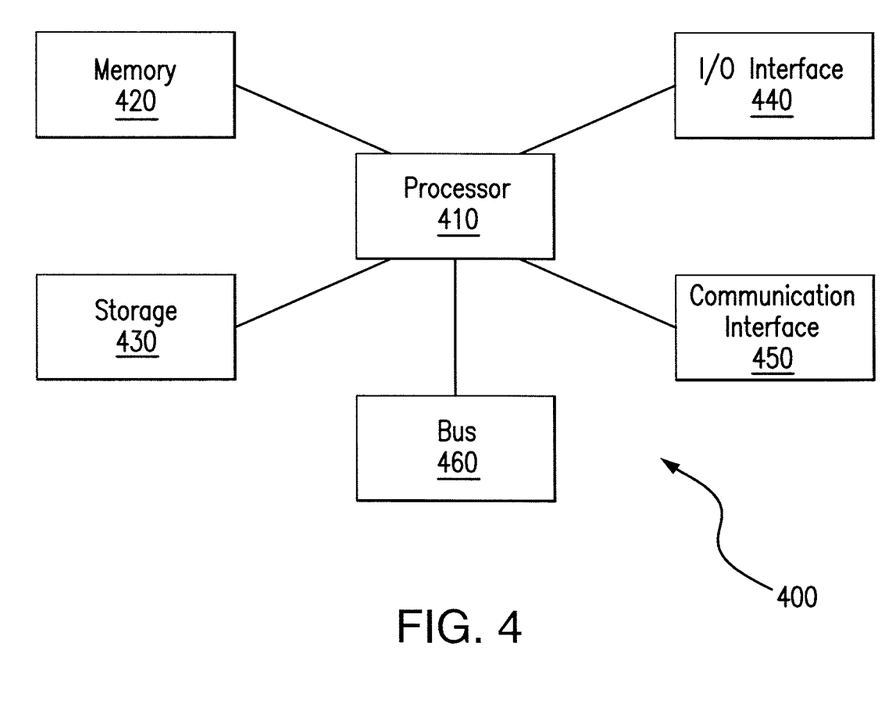
FIG. 4 is a block diagram illustrating a computer configured to implement the method of FIG. 3, according to certain embodiments.

FIG. 4 illustrates an example of a computer system 400. As described above, key management tool 130 may be a program that is implemented by a processor of a computer system such as computer system 400. Computer system 400 may be any suitable computing system in any suitable physical form. As an example and not by way of limitation, computer system 400 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

One or more computer systems 400 may perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As an example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 may include a processor 410, memory 420, storage 430, an input/output (I/O) interface 440, a communication interface 450, and a bus 460 in some embodiments, such as depicted in FIG. 4. Although this disclosure describes and illustrates a particular computer system having a particular number of particular components in a particular arrangement, this disclosure contemplates any suitable computer system having any suitable number of any suitable components in any suitable arrangement.

Processor 410 includes hardware for executing instructions, such as those making up a computer program, in particular embodiments. For example, processor 410 may execute key management tool 130 in some embodiments. As an example and not by way of limitation, to execute instructions, processor 410 may retrieve (or fetch) the instructions from an internal register, an internal cache, memory 420, or storage 430; decode and execute them; and then write one or more results to an internal register, an internal cache, memory 420, or storage 430. In particular embodiments, processor 410 may include one or more internal caches for data, instructions, or addresses. This disclosure contemplates processor 410 including any suitable number of any suitable internal caches, where appropriate. As an example and not by way of limitation, processor 410 may include one or more instruction caches, one or more data caches, and one or more translation lookaside buffers (TLBs). Instructions in the instruction caches may be copies of instructions in memory 420 or storage 430, and the instruction caches may speed up retrieval of those instructions by processor 410. Data in the data caches may be copies of data in memory 420 or storage 430 for instructions executing at processor 410 to operate on; the results of previous instructions executed at processor 410 for access by subsequent instructions executing at processor 410 or for writing to memory 420 or storage 430; or other suitable data. The data caches may speed up read or write operations by processor 410. The TLBs may speed up virtual-address translation for processor 410. In particular embodiments, processor 410 may include one or more internal registers for data, instructions, or addresses. This disclosure contemplates processor 410 including any suitable number of any suitable internal registers, where appropriate. Where appropriate, processor 410 may include one or more arithmetic logic units (ALUs); be a multi-core processor; or include one or more processors 175. Although this disclosure describes and illustrates a particular processor, this disclosure contemplates any suitable processor.

Memory 420 may include main memory for storing instructions for processor 410 to execute or data for processor 410 to operate on. As an example and not by way of limitation, computer system 400 may load instructions from storage 430 or another source (such as, for example, another computer system 400) to memory 420. Processor 410 may then load the instructions from memory 420 to an internal register or internal cache. To execute the instructions, processor 410 may retrieve the instructions from the internal register or internal cache and decode them. During or after execution of the instructions, processor 410 may write one or more results (which may be intermediate or final results) to the internal register or internal cache. Processor 410 may then write one or more of those results to memory 420. In particular embodiments, processor 410 executes only instructions in one or more internal registers or internal caches or in memory 420 (as opposed to storage 430 or elsewhere) and operates only on data in one or more internal registers or internal caches or in memory 420 (as opposed to storage 430 or elsewhere). One or more memory buses (which may each include an address bus and a data bus) may couple processor 410 to memory 420. Bus 460 may include one or more memory buses, as described below. In particular embodiments, one or more memory management units (MMUs) reside between processor 410 and memory 420 and facilitate accesses to memory 420 requested by processor 410. In particular embodiments, memory 420 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 420 may include one or more memories 180, where appropriate. Although this disclosure describes and illustrates particular memory, this disclosure contemplates any suitable memory.

Storage 430 may include mass storage for data or instructions. As an example and not by way of limitation, storage 430 may include a hard disk drive (HDD), a floppy disk drive, flash memory, an optical disc, a magneto-optical disc, magnetic tape, or a Universal Serial Bus (USB) drive or a combination of two or more of these. Storage 430 may include removable or non-removable (or fixed) media, where appropriate. Storage 430 may be internal or external to computer system 400, where appropriate. In particular embodiments, storage 430 is non-volatile, solid-state memory. In particular embodiments, storage 430 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 430 taking any suitable physical form. Storage 430 may include one or more storage control units facilitating communication between processor 410 and storage 430, where appropriate. Where appropriate, storage 430 may include one or more storages 140. Although this disclosure describes and illustrates particular storage, this disclosure contemplates any suitable storage.

I/O interface 440 may include hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 440 may include one or more device or software drivers enabling processor 410 to drive one or more of these I/O devices. I/O interface 440 may include one or more I/O interfaces 185, where appropriate. Although this disclosure describes and illustrates a particular I/O interface, this disclosure contemplates any suitable I/O interface.

Communication interface 450 may include hardware, software, or both providing one or more interfaces for communication (such as, for example, packet-based communication) between computer system 400 and one or more other computer systems 400 or one or more networks (e.g., network 110). As an example and not by way of limitation, communication interface 450 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 450 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 450 for any of these networks, where appropriate. Communication interface 450 may include one or more communication interfaces 190, where appropriate. Although this disclosure describes and illustrates a particular communication interface, this disclosure contemplates any suitable communication interface.

Bus 460 may include hardware, software, or both coupling components of computer system 400 to each other. As an example and not by way of limitation, bus 460 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 460 may include one or more buses 212, where appropriate. Although this disclosure describes and illustrates a particular bus, this disclosure contemplates any suitable bus or interconnect.

The components of computer system 400 may be integrated or separated. In some embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration network environment 100 may include any suitable number of compressors, condensers, condenser fans, evaporators, valves, sensors, controllers, and so on, as performance demands dictate. One skilled in the art will also understand that refrigeration network environment 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A key management tool comprising:
a memory configured to store a plurality of temporary keys, a plurality of permanent keys, and pre-defined credentials;
an interface configured to:
receive, from a first device that is unknown to a system, one or more unsecure communications, wherein:
the one or more unsecure communications comprise one or more of:
attributes of the first device, the attributes comprising one or more of specifications or capabilities of the first device; or
one or more credentials comprising identifying information of the first device;
a device is unknown to the key management tool when the device has not previously communicated with the key management tool and a device is known to the key management tool when the device has previously communicated with the key management tool;
a compatibility engine configured to determine, based on the attributes of the first device, that the first device is compatible with the key management tool, wherein the first device is compatible with the key management tool if it can send and receive secure communications to the key management tool;
a validation engine configured to validate the first device based on the received credentials of the first device, wherein validating the first device comprises comparing the received credentials of the first device to one or more of the pre-defined credentials;
a distribution engine configured to communicate a first temporary key of the plurality of stored temporary keys to the first device after determining that the first device is valid;
a verification engine configured to perform a first set of one or more checks on the first device after the first temporary key is communicated to the first device, the one or more checks being performed to determine whether the first device is a threat;
wherein the distribution engine is further configured to communicate a first permanent key from the plurality of stored permanent keys to the first device if the first device passes the first set of one or more checks, the first permanent key having an expiration date; and
wherein the interface is further configured to receive, from the first device, a request for a second permanent key from the plurality of stored keys at a time subsequent to the communication of the first permanent key.

2. The key management tool of claim 1, wherein each permanent key of the plurality of permanent keys is used to facilitate communications between two or more devices that are known to the key management tool.

3. The key management tool of claim 1, further comprising a disabling engine configured to disable the temporary key that was communicated to the first device in response to determining that the permanent key has been communicated to the first device, wherein the first device is no longer able to communicate with the key management tool using the temporary key once the temporary key is disabled.

4. The key management tool of claim 1, wherein the distribution engine is further configured to not distribute a permanent key of the plurality of stored permanent keys to the first device if the first device fails one or more of the one or more checks.

5. The key management tool of claim 1, wherein the request for the new permanent key is sent automatically from the first device based on the expiration date of the first permanent key.

6. The key management tool of claim 1, wherein the request for the new permanent key comprises one or more of attributes of the first device or credentials of the first device.

7. The key management tool of claim 1, wherein: the compatibility engine is further configured to determine, based on the request for the new permanent key, that the first device is compatible with the key management tool; the validation engine is further configured to validate the first device based on the request for the new permanent key; the distribution engine is further configured to distribute a second temporary key from the plurality of stored temporary keys to the first device if the first device is validated; the verification engine is further configured to, perform a second set of one or more checks on the first device after the second temporary key is distributed to the first device; and the distribution engine is further configured to distribute a second permanent key from the plurality of stored permanent keys to the first device if the first device passes the second set of one or more checks, the second permanent key being associated with an expiration date.

8. The key management tool of claim 7, wherein the expiration date associated with the second permanent key is a date later in time than the expiration date associated with the first permanent key.

9. A method comprising:
receiving, from a first device that is unknown to a key management tool, one or more unsecure communications, wherein:
the one or more unsecure communications comprise one or more of:
attributes of the first device, the attributes comprising one or more of specifications or capabilities of the first device; or
one or more credentials comprising identifying information of the first device;
a device is unknown to the key management tool when the device has not previously communicated with the key management tool and a device is known to the key management tool when the device has previously communicated with the key management tool;
determining, based on the attributes of the first device, that the first device is compatible with the key management tool, wherein the first device is compatible with the key management tool if it can send and receive secure communications to the key management tool;
validating the first device based on the received credentials of the first device, wherein validating the first device comprises comparing the received credentials of the first device to one or more pre-defined credentials;
after determining that the first device is valid, communicating a first temporary key of the plurality of stored temporary keys to the first device;

after the first temporary key is communicated to the first device, performing a first set of one or more checks on the first device, the one or more checks being performed to determine whether the first device is a threat;

if the first device passes the first set of one or more checks, communicating a first permanent key from the plurality of stored permanent keys to the first device, the first permanent key having an expiration date; and receiving, from the first device a request for a new permanent key from the plurality of stored keys at a time subsequent to the communication of the first permanent key.

10. The method of claim 9, further comprising disabling the first temporary key that was communicated to the first device in response to determining that the first permanent key has been communicated to the first device, wherein the first device is no longer able to communicate with the key management tool using the temporary key once the temporary key is disabled.

11. The method of claim 9, wherein the request for the new permanent key is sent automatically from the first device based on the expiration date of the first permanent key.

12. The method of claim 9, wherein the request for the new permanent key comprises one or more of attributes of the first device or credentials of the first device.

13. The method of claim 9, further comprising:
determining, based on the request for the new permanent key, that the first device is compatible with the key management tool;
validating the first device based on the request for the new permanent key;
if the first device is validated, distributing a second temporary key from the plurality of stored temporary keys to the first device;
after the second temporary key is distributed to the first device, performing a second set of one or more checks on the first device; and
if the first device passes the second set of one or more checks, distributing a second permanent key from the plurality of stored permanent keys to the first device, the second permanent key being associated with an expiration date.

14. The method of claim 13, wherein the expiration date associated with the second permanent key is a date later in time than the expiration date associated with the first permanent key.

15. A system comprising:
a memory configured to store a plurality of temporary keys and a plurality of permanent keys;
an interface configured to:
receive, from a first device that is unknown to the system, one or more unsecure communications, wherein:
the one or more unsecure communications comprise one or more of:
attributes of the first device, the attributes comprising one or more of specifications or capabilities of the first device; or
one or more credentials comprising identifying information of the first device;
a device is unknown to the system when the device has not previously communicated with the system and a device is known to the system when the device has previously communicated with the system;
one or more processors configured to:
determine, based on the attributes of the first device, that the first device is compatible with the system, wherein the first device is compatible with the system if it can send and receive secure communications using the system;
validate the first device based on the received credentials of the first device, wherein validating the first device comprises comparing the received credentials of the first device to one or more pre-defined credentials;
after determining that the first device is valid, communicate a first temporary key of the plurality of stored temporary keys to the first device;
after the first temporary key is communicated to the first device, perform a first set of one or more checks on the first device, the one or more checks being performed to determine whether the first device is a threat to the system;
if the first device passes the first set of one or more checks, communicate a first permanent key from the plurality of stored permanent keys to the first device, the first permanent key having an expiration date; and
wherein the interface is further configured to receive, from the first device a request for a new permanent key from the plurality of stored keys at a time subsequent to the communication of the first permanent key.

16. The system of claim 15, wherein the one or more processors are further configured to disable the first temporary key that was communicated to the first device in response to determining that the first permanent key has been communicated to the first device, wherein the first device is no longer able to communicate with the system using the temporary key once the temporary key is disabled.

17. The system of claim 15, wherein the request for the new permanent key is sent automatically from the first device based on the expiration date of the first permanent key.

18. The system of claim 15, wherein the request for the new permanent key comprises one or more of attributes of the first device or credentials of the first device.

19. The system of claim 18, wherein the one or more processors are further configured to:
determine, based on the request for the new permanent key, that the first device is compatible with the system;
validate the first device based on the request for the new permanent key;
if the first device is validated, distribute a second temporary key from the plurality of stored temporary keys to the first device;
after the second temporary key is distributed to the first device, perform a second set of one or more checks on the first device; and
if the first device passes the second set of one or more checks, distribute a second permanent key from the plurality of stored permanent keys to the first device, the second permanent key being associated with an expiration date.

20. The system of claim 19, wherein the expiration date associated with the second permanent key is a date later in time than the expiration date associated with the first permanent key.

* * * * *